Patented June 4, 1929.

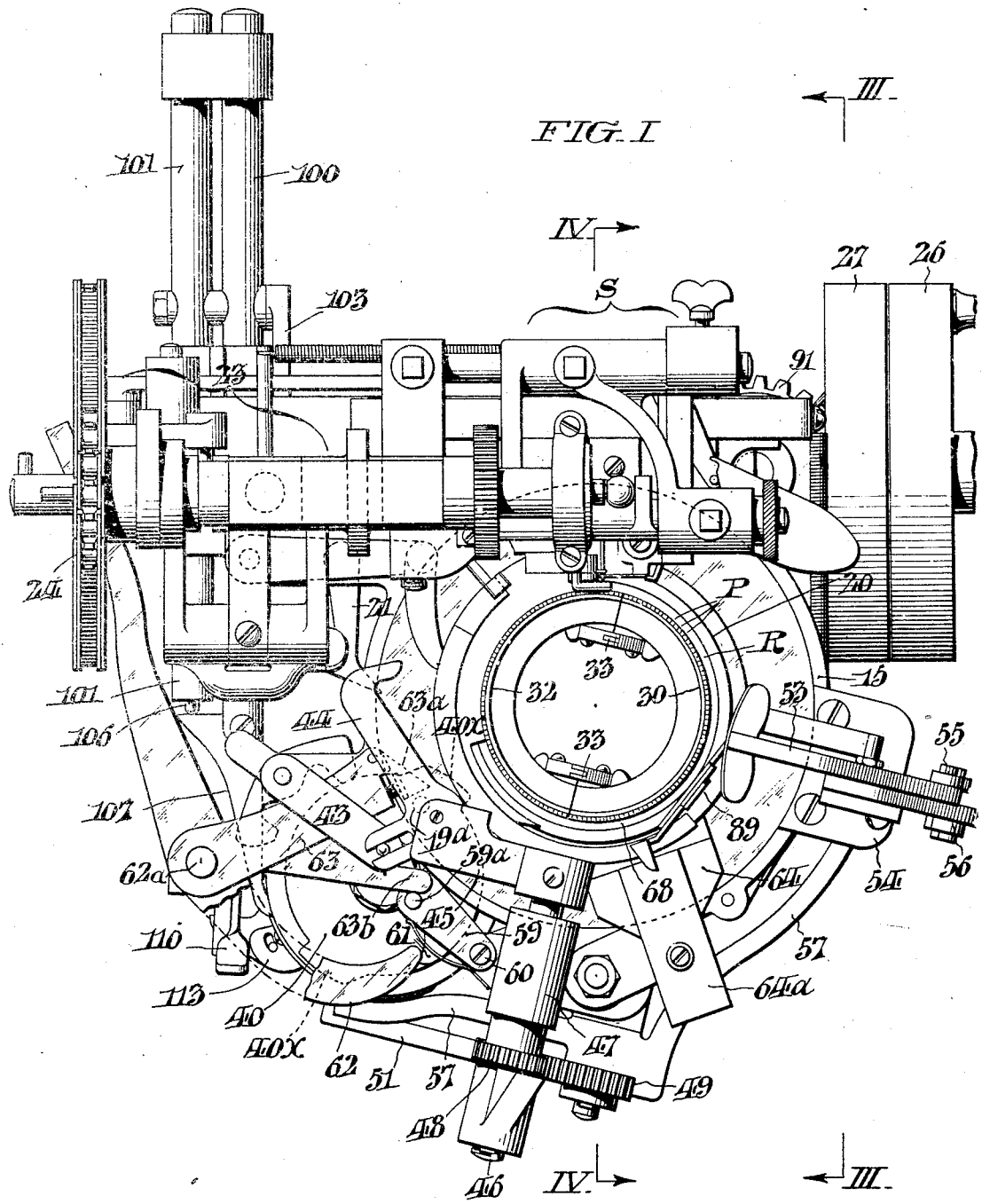

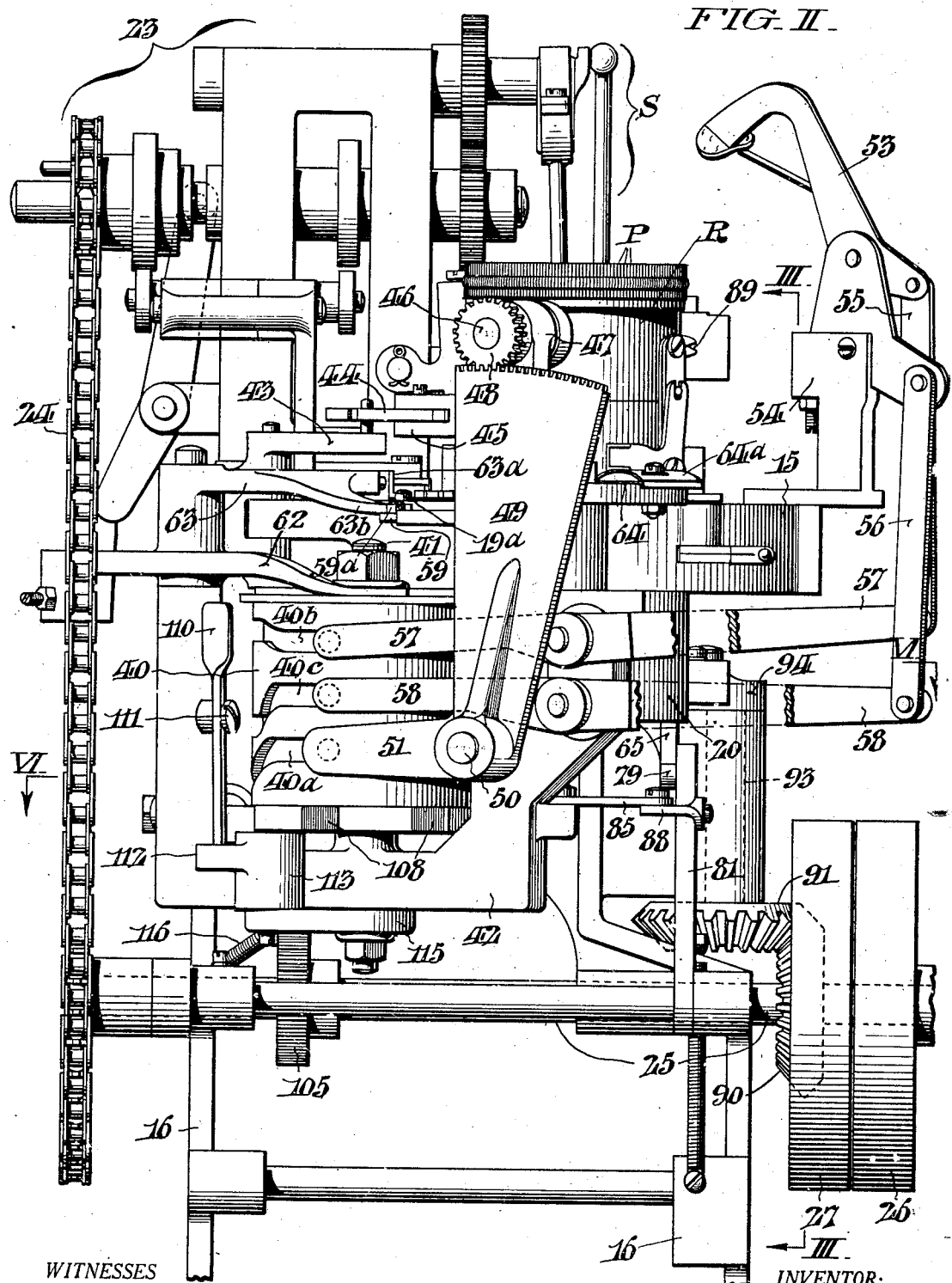

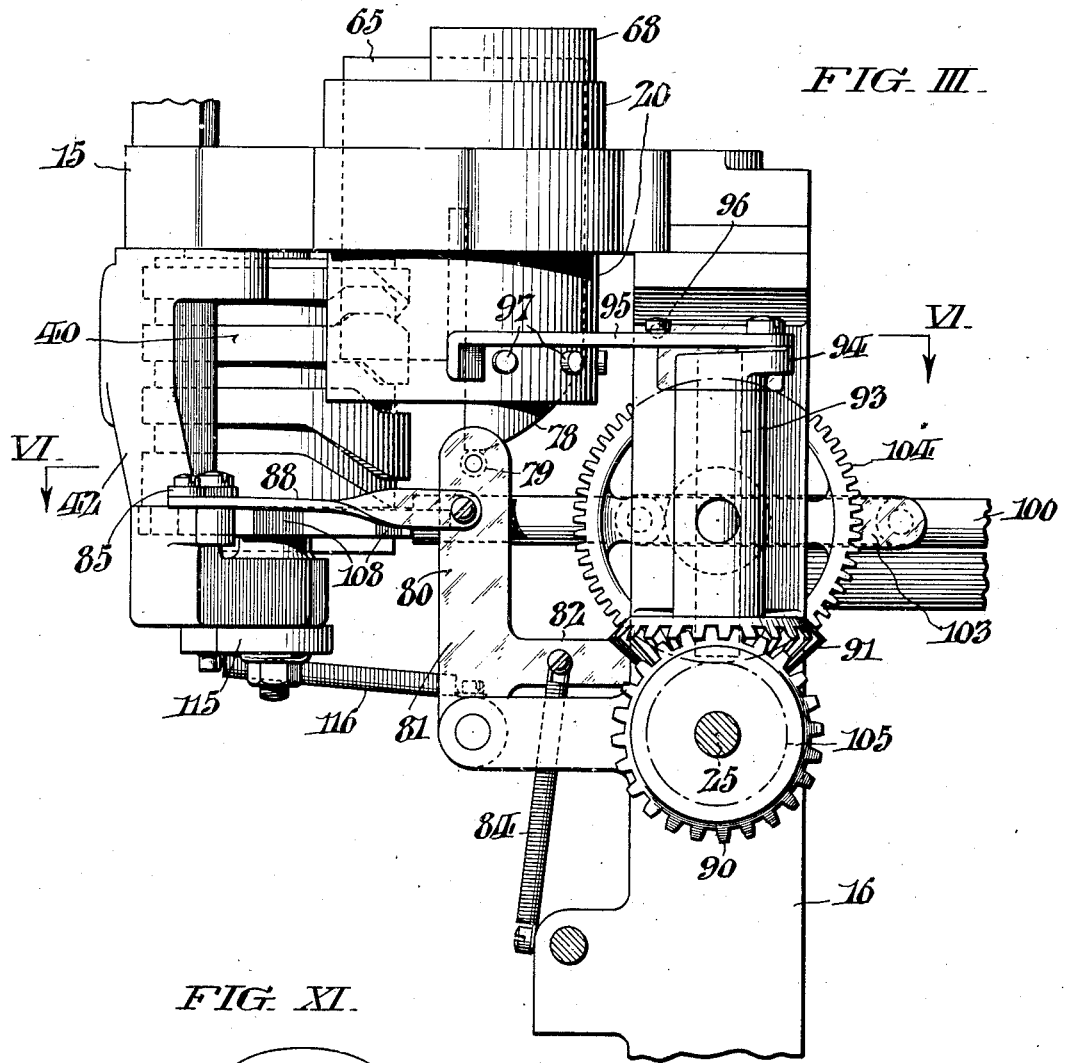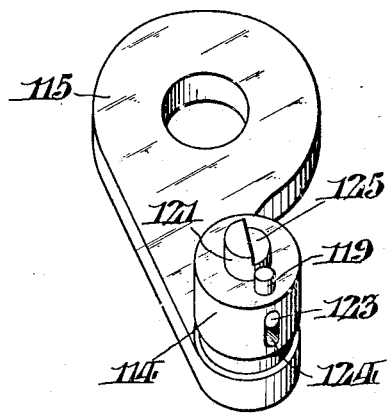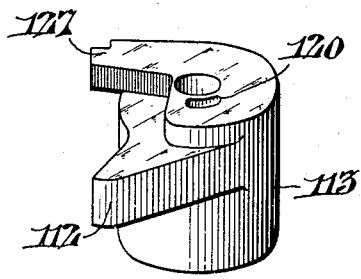

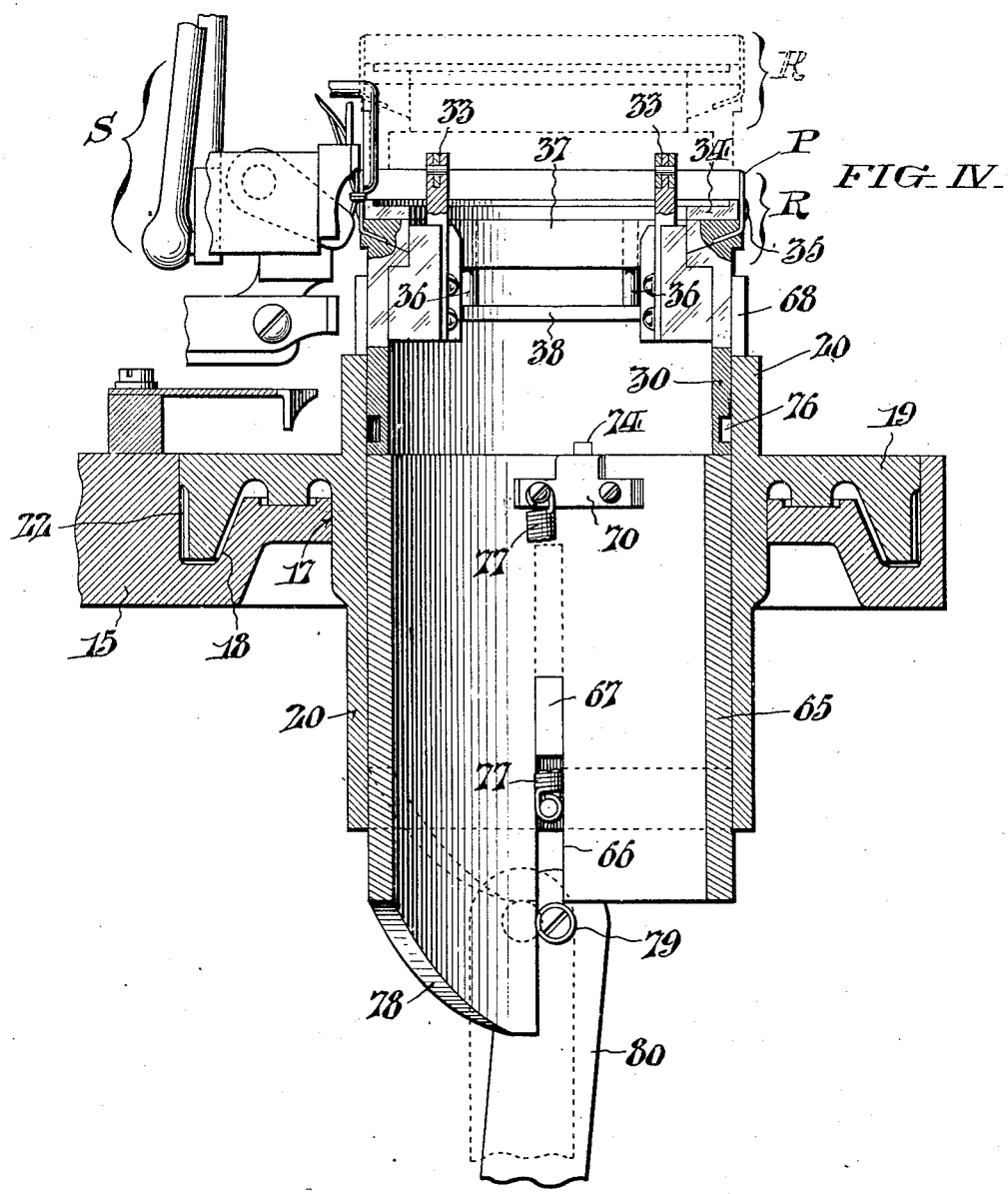
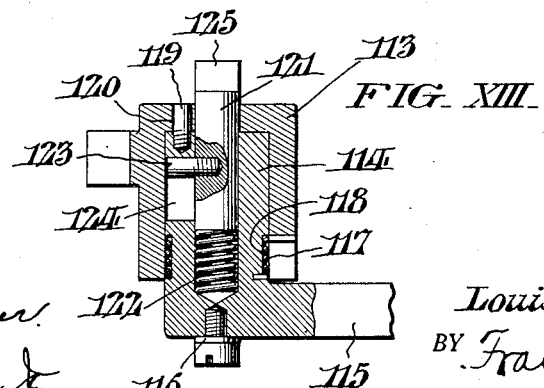

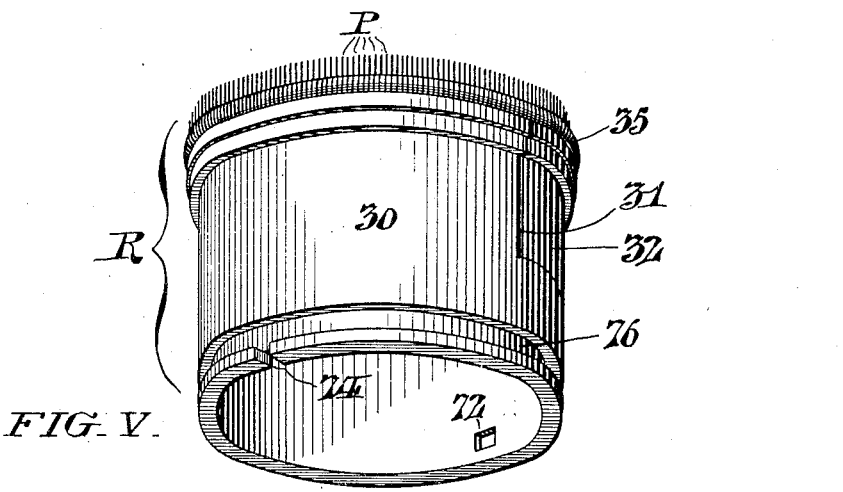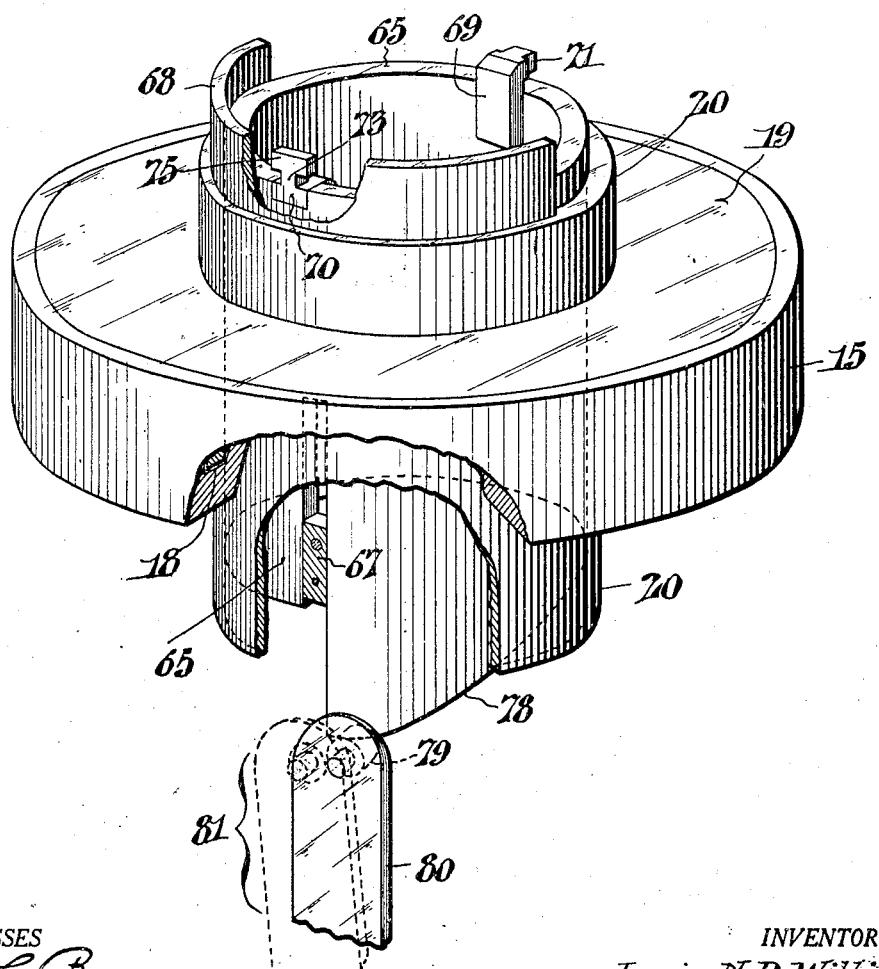

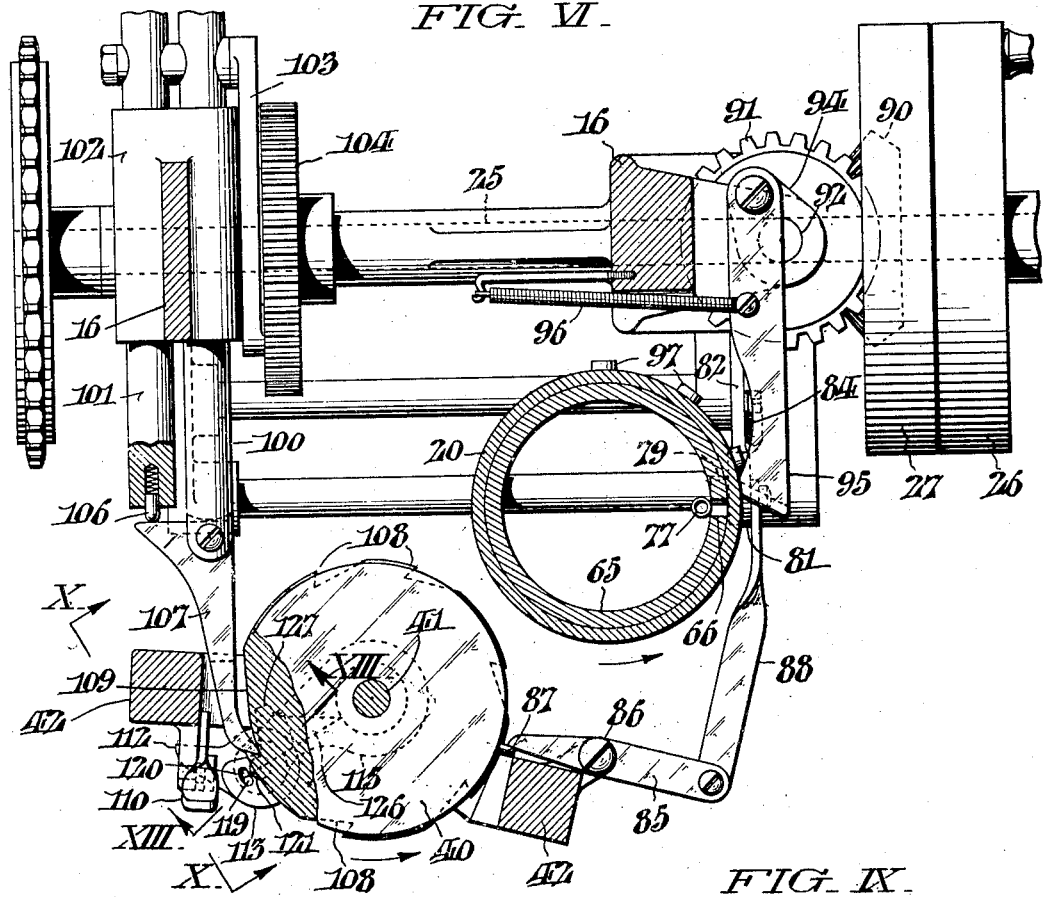
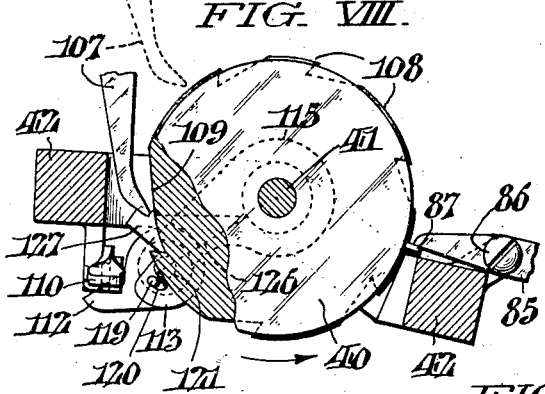
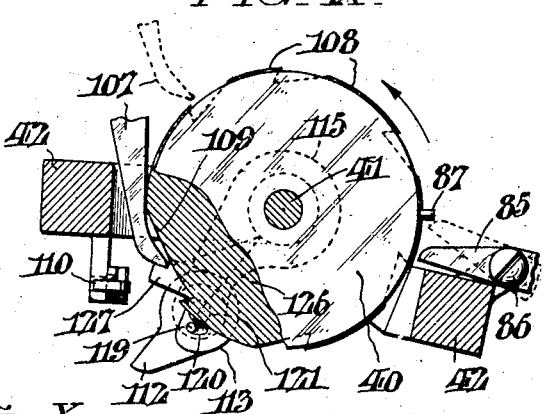

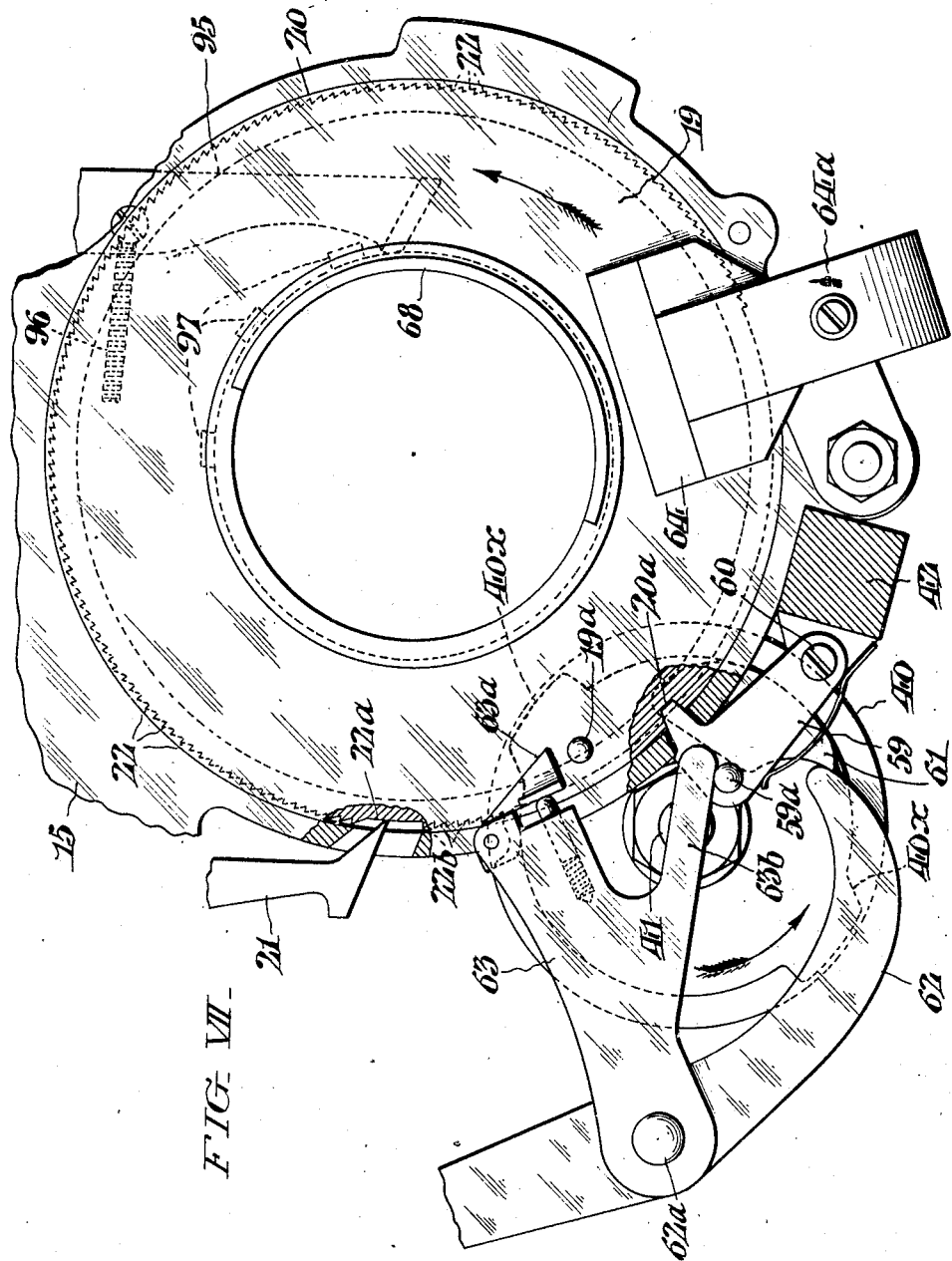

1,715,400

UNITED STATES PATENT OFFICE.

LOUIS N. D. WILLIAMS, OF OGONTZ, PENNSYLVANIA, ASSIGNOR TO SCOTT & WILLIAMS, INCORPORATED, OF NEW YORK, N. Y., A CORPORATION OF MASSACHUSETTS.

MACHINE FOR UNITING KNITTED WEBS.

Application filed January 10, 1927. Serial No. 160,165.

This invention relates to machines for uniting knitted webs, and, more particularly to automatic machines for closing the toe pockets of seamless hosiery produced on circular knitters. A machine of the character referred to is shown and described in U. S. Patent No. 1,315,064 granted to me under date of September 2, 1919; as well as in a pending application bearing Serial No. 680,064, filed by me on December 12, 1923. In practice with such a machine, a special diametrically-divided transfer ring is employed to receive the completed stocking from the knitter by which it is produced, with the terminal course around the toe opening engaged, loop for loop, on its points. This transfer ring is placed on the rotary supporting carrier of the machine, and, upon starting of the latter, automatic means come into play to first double the fabric loops on one semi-circular section of the ring with those on the component ring section; and when this is accomplished, the carrier is intermittently progressed to successively present the doubled loops to the sewing mechanism by which they are united, the machine coming to rest automatically at the completion of the operation to permit removal of the transfer ring for re-use. With the web uniting machine as heretofore constructed, proper placement of the transfer ring on the rotating carrier was a comparatively difficult and an exacting operation, while carelessness on the part of operatives in this regard resulted either in damage to the points of the ring or in dropping of the doubled fabric loops (which accordingly remained unsewn) with consequent production of seconds that had to be disposed of at a loss.

The present invention is directed, in part, toward obviating the contingencies above noted; and this end I attain through provision of means by which application and removal of the transfer ring to and from the rotating carrier is greatly facilitated, and whereby accurate registry and interlock between the two is absolutely assured for proper operative coordination of said ring with the sewing mechanism.

A further object of the present invention is to enable, through various structural improvements, attainment of the highest possible operative speed with correspondingly increased output from the machine.

Other objects and attendant advantages of my present invention will be readily apparent from the following detailed description of the typical embodiment delineated in the drawings, whereof Fig. I shows a plan view of the machine.

Fig. II is an elevation of the same, as viewed from the bottom of Fig. I.

Fig. III is a part sectional elevation, taken in accordance with arrows III—III in Figs. I and II.

Fig. IV is an axial section through the rotating carrier for the transfer ring, in accordance with the arrows IV—IV in Fig. I.

Fig. V is a perspective view of the rotating carrier and the transfer ring in readiness to be mounted thereon.

Fig. VI is a staggered plan sectional view, as designated by the arrows VI—VI in Figs. II and III.

Fig. VII is a diagrammatic plan view showing the means for rotatively progressing the carrier for the transfer ring.

Figs. VIII and IX are local sections, in the same plane as Fig. VI, showing certain parts in different relative positions.

Fig. X is a fragmentary detail elevation, viewed in accordance with the arrows X—X in Fig. VI.

Figs. XI and XII are perspective views of certain parts associated with the starting mechanism of the machine; and, Fig. XIII is a detail sectional view taken as indicated by the arrows XIII—XIII in Fig. VI.

With more specific reference to these illustrations, 15 designates the bed plate of the machine, the same being supported, as shown in Fig. II, at the top of a suitable sub-frame 16. The overhanging portion of the bed plate 15 has a circular opening 17 Fig. IV surrounded by an annular retaining recess 18 which affords a depressed bearing surface to seat and rotatably support the horizontal concentric flange 19 of a cylindric carrier 20 whereby the transfer ring, comprehensively designated R in Figs. IV and V, is supported incidental to being intermittently stepped around relative to the sewing mechanism comprehensively designated S in Figs. I and II and shown as being of the type set forth in U. S. Patent No. 1,069,336 of August 5, 1913 to George Keyser. This stepping function is in part relegated to a pawl 21 adapted to pick circumferential teeth 22 extending, as shown in Fig. VII, part way around the horizontal flange 19 of the carrier 20, said pawl being actuated by mechanism 23 identical with that provided for the same purpose in my patent hereinbefore referred to. The mechanism 23, as well as the sewing mechanism S, derives motion, through a sprocket chain connection 24, from the main shaft 25 of the machine, said shaft being journalled in the sub-frame 16 and equipped with tight and loose pulleys 26, 27.

As shown in Figs. IV and V, the transfer ring R comprises a main hollow cylindric body section 30 whereof the upper part is cut away, as at 31, to a circumferential extent of one hundred and eighty degrees to accommodate a semi-circular inset segment 32 with diametrically-opposite hinge connections 33 (see Fig. I also) at the level of the complemental groups of points P projecting, respectively, from the upper edges of the two ring components 30, 32. This arrangement permits the section 32 to be swung over upon the section 30 so that the fabric loops on the points P of the former can be doubled with the loops on the points P of the latter. For the purpose of this operation, the ring section 32 is equipped with a loop stripper such as shown in Fig. IV, having the form of a semi-circular plate 34 with circumferential projections 35 that extend outward between the points P, said stripper normally occupying the retracted position illustrated. The movement of the stripper 34 is guided by attached rods 36 that are slidable in openings through an internal flange 37 of the ring, and is actuatable through the medium of a segmental plate 38 joining the opposite protruding ends of said rods.

The mechanisms already referred to, as well as others yet to be described, are all controlled by a master cam drum 40 which is mounted for free rotation about a fixed axis 41 supported by a drop bracket 42 of the machine frame. As in my pending patent application previously mentioned, on its top, this control drum 40 has cam lugs 40$^x$ adapted to cooperate with pallet-like projections on the hub of a pivoted arm 43 (Fig. I), which is instrumental in actuating a finger 44 designed to engage an opening (not shown) in the movable section 32 of the transfer ring R preparatory to swinging of the latter over the main section 30 incidental to loop doubling. The finger 44 is pivoted on an arm 45 which is secured to the inner end of a radial shaft 46 having bearing in a bracket 47 upstanding from the bed plate 15. At its outer end, the shaft 46 has keyed to it a pinion 48 (Figs. I and II) that meshes with a gear sector 49 with fulcrum bearing on a fixed axis 50 supported by the drop bracket 42 aforementioned. The gear sector 49 is swung through cooperation of a roller on its integral arm 51 with a circumferential cam groove 40$^a$ of the control drum 40. The stripper 34 of the transfer ring R is manipulated by a hooked lever 53 (Figs. I and II) which is pivotally supported by a fixed bracket 54, and given a compound swinging movement through coordination of interposed links 55, 56 having roller arms 57, 58 that are independently pivoted to the bracket 42 and subject to the action of circumferential cam grooves 40$^b$, 40$^c$ in the drum 40, all said instrumentalities functioning precisely like the corresponding elements in my aforementioned patent and co-pending application, and in themselves forming no part of this invention.

Proceeding now to those features which I deem novel in connection with my web-uniting machine, as at present improved, attention is directed to the fact that the ratchet teeth 22 extend only part way around the flange 19 of the carrier 20, the pawl 21 normally playing back and forth within a blank space 22$^a$ (Fig. VII) during the idle periods of the machine, when said carrier is locked against accidental rotation during mounting of the transfer ring R thereon, by a spring-pressed latch 59 engaging a circumferential groove 20$^a$ therein. This latch 59 is pivoted to swing horizontally about a fixed axis 60 afforded by the machine frame as shown. For the purpose of initiating movement of the carrier 20, the control drum 40 is equipped on its top with an edge cam 61 adapted to swing a finger 62 pivoted on an axis 62$^a$, together with an arm 63 having at its end a spring-influenced latch 63$^a$ for engaging a stud 19$^a$ upstanding from the flange 19 of said carrier to advance the latter sufficiently in counter-clockwise direction to bring the first ratchet tooth 22 beyond the blank space 22$^a$ into the province of the pawl 21. To make possible the action just described, it is of course necessary that the latch 59 be withdrawn to free the carrier 20. This function I vest in an angular spur 62$^b$ of the finger 63 adapted to engage a stud 59$^a$ on the latch 59, see Figs. I and II also. With this arrangement it will be seen that release of the carrier 20 is effected concurrently with initiation of its progression. To prevent overthrow or retrogression of the carrier 20 under the action of pawl 21, more particularly during the sewing operation, a brake is provided in the form of a friction plate 64, bearing on the top of the horizontal carrier flange 19, under pressure exerted by a bowed leaf spring 64$^a$, see Figs. I, II and VII.

Fitted for up and down movement within the vertical bore of the carrier 20 is a sleeve 65 which serves to directly support the transfer ring R, said sleeve being longitudinally slotted as at 66 to engage a key 67 so as to be held against independent rotation relative to the carrier 20, see Figs. V and VI. When the machine is at rest, the sleeve 65 occupies the elevated position shown in full lines in Fig. V and in dotted lines in Fig. IV with its upper edge well above the top of the carrier 20, thereby to facilitate initial application—as well as subsequent removal—of the transfer ring R. Part way around its top, the carrier 20 has an upstanding semi-circular guard 68 which aids, after the manner of a guide, in placing the ring R in the machine. The proper position of the ring R, circumferentially of the carrier 20, is determined by lugs 69, 70 (Fig. V) at the top of the sleeve 65, the first mentioned 69 of these having a lateral projection 71 to engage an aperture 72 at one side of the ring R, while the other 70 has a reduced portion 73 to engage a notch 74 in the bottom of the ring, as well as a head 75 to fit a circumferential groove 76 in said ring and to overlap the shoulder within the groove at opposite sides of said notch. Thus in mounting, the transfer ring R is first placed upon the top of the sleeve 65 under guidance of the guard 68, and slid laterally until the lug 70 is engaged in the notch 74 and groove 76, and the lug 69 concurrently engaged in the opening 72. This can easily be accomplished with one hand, and by virtue of the difference in the character of the lugs 69, 70, the possibility of improper placement of the ring R is obviously precluded. As the sleeve 65 is lowered in the manner to be presently explained, the ring R must needs follow as a consequence of the interlock determined by the lug 70, and in receding, its lower end engages within the hollow of the carrier 20 so as to be held against lateral displacement during subsequent uniting of the fabric loops on the points P of the transfer ring R by the sewing mechanism S. Now it will be observed from Fig. IV that the key 67 in addition to the function already described, serves as a stop through cooperation with the upper end of the slot 66 to determine the lowered position of the sleeve 65 (shown in full lines in Fig. IV) to which said sleeve is held during the rotation of the carrier 20 by a coiled tension spring 77 with the transfer ring R in proper coordinative relation to the sewing mechanism S. During the final quarter of its rotation the sleeve 65 is elevated, from the active lower position of Fig. IV to the elevated position of Fig. V, through incidental riding of an inclined cam edge 78 at its bottom, upon a roller 79 on the upstanding extremity 80 of a bell crank lever 81, that normally occupies the position shown in Fig. III as determined by contact of its horizontal extremity 82 with the machine frame, in which position it is yieldingly maintained by a helical tension spring 84. The cam edge 78 ends abruptly in coincidence with one side edge of the slot 66 previously referred to, so that upon movement of the bell crank 81 to the dotted line position of Fig. V, the sleeve 65 is freed to the action of the spring 77 and accordingly drops to the lowered position of Fig. IV immediately upon starting of the machine. This action is brought about through functioning of a trip lever 85, which, as shown in Fig. VI, is pivoted at 86 to the bracket 42, for engagement of its free end by a laterally projecting stud 87 on the control drum 40, and coupled with the bell crank 81 by a connecting link 88, see Figs. III and VI.

Incidental to closure of the toe openings of stockings with my machine, the actual work of uniting the fabric loops doubled on the points P of the main section 30 of the transfer ring R as previously explained, is substantially accomplished during the first half rotation of the carrier 20. Therefore, in order to save time in progression of the carrier 20 through the remaining part revolution of its operative cycle, which is unproductive of any useful work save for actuation of the shears—shown at 89 in Figs. I and II—to sever a trailing chain of loops formed as a consequence of continued operation of the sewing mechanism S, I make the following provisions: Secured to the main drive shaft 25 of the machine within the hollow of the loose pulley 27, is a miter gear 90 that communicates motion to an intermeshing miter gear 91 on a vertical shaft 92 journalled in a fixed bearing 93, see Figs. II, III and VI. At the upper end of this vertical shaft 92 is secured a crank arm 94 whereto is pivoted a racking pawl 95 which is maintained in operative contact with the depending tubular portion of the carrier 20 by a pull spring 96 for capacity to successively engage lugs 97 extending at well spaced intervals part way about said carrier in a corresponding horizontal plane.

The improved means which I provide for intermittently rotating the control drum 40 in accordance with my present invention includes, as shown in Figs. III and VI, a pair of interconnected parallel slide bars 100, 101 accorded support for horizontal endwise sliding, in a bearing 102 provided by the subframe 16 of the machine to receive reciprocatory movement through an interposed crank link connection 103 with a gear wheel 104 in mesh with a pinion 105 on the main drive shaft 25. Pivoted to the end of one of the slide bars 100, 101 and subject to the influence of a contacting spring pressed plunger 106 in the corresponding end of the other of said rods, is a pawl 107 adapted to pick a series of ratchet teeth 108 at the bottom of the control drum 40, the series being interrupted at one point by a blank space 109 over which the pawl rides idly back and forth during the periods between successive operative cycles of the machine.

For the purpose of manual control in starting, the machine is equipped with a finger lever 110, which, as shown in Figs. II and VI, is fulcrumed at 111 to the bracket 42. The lower end of this finger lever 110 intersects the path of a finger 112 projecting laterally from a trigger element 113 (Fig. XII) mounted for oscillation on a cylindric boss 114 upstanding from the end of an arm 115 (Fig. XI). This arm 115 is mounted with capacity for independent oscillation, to the lower end of the axis 41 whereon the control drum 40 rotates, the induced movements of said arm being yieldingly resisted by a helical tension spring 116. A torsion spring 117 (Fig. XIII) nested in a circumferential recess 118 of the boss 114 is influential in urging the trigger element 113 clockwise, with reference to Figs. VI–X, and it has freedom of retrograde movement within the limit prescribed by cooperation of a stop stud 119 projecting up from the boss 114 with an arcuate slot 120 in said trigger element. As shown in Fig. XIII, the boss 114 is axially bored to receive and guide a plunger pin 121 capable of downward movement in opposition to a compression spring 122 beneath it within said bore. The plunger pin 121 is held against ejection—as well as against rotation—by a stud 123 that projects laterally into a vertical motion-limiting slot 124 in the side of the boss 114. The protruding end of the pin 121 is cut away as at 125 (Fig. XI) with resultant formation of a straight-edged tooth adapted to engage a recess or notch 126 in the bottom face of the drum 40, see Fig. X. When the finger lever 110 is actuated, it will be apparent that the trigger element 113 is rotated counter-clockwise in opposition to the torsion spring 117 to an extent determined by the slot 120, to the position of Fig. VIII. As a consequence, a shouldered notch in a lateral lug projection 127 of the trigger element 113 is brought into the path of the pawl 107, and, upon being engaged, is bodily moved by said pawl, the part 115 carrying the trigger element 113 being obliged to follow such induced movement. Through cooperation of the plunger pin 121 with the notch 126 in the base of the control drum 40, it will be seen that the blank space 109 is advanced beyond the province of the pawl 107 to the position shown in Fig. IX, so that upon the next pick, said pawl engages the first ratchet tooth of the series 108 in initiating the rotative phase of the control drum 40.

The operation of my web uniting machine as now improved, is as follows: Assuming the machine to be at rest and the sleeve 65 of the carrier 20 elevated as shown in Fig. V, the transfer ring R—having the loops of the terminal course of a knitted stocking fabric impaled on its points P—is first placed and locked in position on the sleeve 65 in the manner previously explained, with the trailing end of the stocking hanging down within the axial hollow of said carrier. Upon completion of the above preparatory step, the finger lever 110 is manipulated to shift the trigger 113, this being followed by advancement of the blank space 109 on the control drum 40 and resulting in initiation of intermittent picking of said drum through its rotative phase by the pawl 107. During the very first movement of the control drum 40, it will be apparent from Fig. VI that the pin 87 is caused to trip the lever 85, such movement being communicated to the bell crank 81—Fig. III—as a result of which it is rocked from the full line position to the dotted line position of Fig. V, so that its roller 79 is withdrawn from beneath the sleeve 65. Immediately upon being freed to the action of the spring 77—Fig. IV, the sleeve 65 drops to the lowered position determined by the key 67, carrying with it the transfer ring R. As a consequence, the lower part of the ring R is seated against displacement laterally, within the bore of the carrier 20, and its points P positioned in proper coordinative relation to the sewing instrumentalities of the mechanism S. During the ensuing progression of the control drum 40, the finger 44 is first moved inward to engage the pivoted section 32 of the transfer ring R through motion induced by the leading cam lug 40$^x$ on the drum 40, whereupon the sector 49 is actuated, as determined by the cam groove 40$^a$ of the drum 40, to swing said transfer ring section 32 over upon the main ring section 30 thus to align the loop retaining points P on these respective ring sections. This is followed by actuation of the lever 53—as determined by the cam grooves 40$^b$, 40$^c$ of the drum 40—to reciprocate the stripper 34 of the transfer ring R in doubling the fabric loops on the section 32 with those of the section 30. The ring section 32 is thereupon restored to its original position by return movement of the gear sector 49, and the finger 44 retracted through passing of the cam lug 40$^x$ on the drum 40 beyond the pivotal region of the arm 43. The fabric loops being now doubled on the points of the ring section 30, the carrier 20 is set into motion through withdrawal of the latch 59 and the starting shog administered concurrently by actuation of the finger 63, also under control of the cam drum 40 as previously explained. The carrier 20 is thereupon picked, a tooth at a time, with presentation of the ring points P successively to the sewing mechanism S for uniting of the doubled fabric loops on them. By the time the actual sewing is finished, and the trailing chain of stitches is cut by the shears 89, the projections 97 of the carrier 20 reach the pawl 95—Fig. VI—and from then on said carrier is rotated at a faster rate until finally restored to the normal starting or rest position through picking of the few special teeth 22ᵇ by the pawl 21, said pawl thereafter playing in a blank space 22ᵃ. During the latter part of the carrier movement, the cam edge 78 rides up upon the roller 79 of the bell crank 81 as a consequence of which the transfer ring R is raised to the original position for convenience of removal and re-use.

Having thus described my invention, I claim:

1. A machine for uniting knitted webs comprising sewing mechanism, and a rotating support for a transfer ring having points adapted to be successively presented, for uniting of fabric loops thereon, to the sewing mechanism; in combination with means for moving the support from an active position in which the transfer ring is operatively coordinated with the sewing mechanism to a position in which said ring is clear of said sewing mechanism for ease of removal of the same from the machine upon completion of the sewing operation.

2. A machine for uniting knitted webs comprising sewing mechanism, and a rotating support for a transfer ring having points adapted to be successively presented, for uniting of fabric loops thereon, to the sewing mechanism; in combination with means for moving the support from a position clear of the sewing mechanism to facilitate application of the transfer ring to an active position with respect to said sewing mechanism, and again subsequently to restore the support to the first mentioned position upon completion of the sewing operation to facilitate removal of the transfer ring from the machine.

3. A machine for uniting knitted webs comprising sewing mechanism, and a rotating support for a transfer ring having fabric-loop-retaining points adapted to be successively presented, for uniting of fabric loops thereon, to the sewing mechanism; in combination with means for elevating the support to raise the ring clear of the sewing mechanism upon completion of the sewing operation.

4. A machine for uniting knitted webs comprising sewing mechanism, and a rotating support for a transfer ring having fabric-loop-retaining points adapted to be successively presented, for uniting of fabric loops thereon, to the sewing mechanism; in combination with means for lowering the support from a normal raised position at starting of the sewing operation to bring the transfer ring into coordinative relation with the sewing mechanism.

5. A machine for uniting knitted webs comprising sewing mechanism, and a rotating support for a transfer ring having fabric-loop-retaining points adapted to be successively presented, for uniting of fabric loops thereon, to the sewing mechanism; in combination with means for lowering the support from a normal raised position at starting of the sewing operation to bring the transfer ring into coordinative relation with the sewing mechanism, and locking means to insure movement of the ring with the support.

6. A machine for uniting knitted webs comprising sewing mechanism, and a rotating carrier for a transfer ring having fabric-loop-retaining points adapted to be successively presented to the sewing mechanism; in combination with a sleeve element confined to rotation with the carrier but capable of vertical movement relative thereto, and means for elevating said sleeve element to raise the transfer ring clear of the sewing mechanism upon completion of the sewing operation.

7. A machine for uiting knitted webs comprising sewing mechanism, a carrier for a transfer ring having fabric-loop-retaining points, and means to step the carrier through a complete rotation during each operative cycle of the machine for presentation of fabric loops on the points of the transfer ring successively to the sewing mechanism; in combination with an element confined to rotation with the carrier but capable of vertical movement relative thereto, said element occupying an elevated position when the machine is at rest to facilitate application of the point ring, and means operative upon starting of the machine to lower the element and thereby bring the transfer ring into coordinative relation with the sewing mechanism, and upon completion of the operative cycle to restore the element to its original elevated position to facilitate removal of the ring.

8. A machine for uniting knitted webs comprising sewing mechanism, a carrier adapted to receive a transfer ring having fabric-loop-retaining points, and means to step the carrier through a complete rotation during each operative cycle of the machine for presentation of the loops on the points of the transfer ring successively to the needle of the sewing mechanism; in combination with a sleeve confined to rotation with the carrier but capable of up and down movement in a vertical bore of the latter, said sleeve occupying an elevated position when the machine is at rest to facilitate application of the transfer ring, and means operative upon starting of the machine for lowering the sleeve to seat the ring against lateral displacement within the bore of the carrier.

9. A machine for uniting knitted webs comprising sewing mechanism, a support for a transfer ring having fabric-loop-retaining points, and means to stop the support through a complete rotation during each operative cycle of the machine for successive presentation of the fabric loops on its points to the sewing mechanism; in combination with means to automatically lower the support prior to the initiation of its rotative phase from a position facilitating application of the transfer ring, to an active position in coordinative relation with the sewing mechanism and to again restore said support subsequently to its original raised position at the end of its rotative phase to facilitate removal of the ring from the machine.

10. A machine for uniting knitted webs comprising sewing mechanism, and a rotating support for a transfer ring having points adapted to be successively presented, for uniting of fabric loops thereon, to the sewing mechanism; in combination with means to lock the ring to the support including a pair of diametric lugs, one with a lateral projection to engage an aperture in the ring at one side, and the other to engage a notch in the bottom edge of the ring at the opposite side, the latter lug having a head seating in a circumferential groove of the ring and over-reaching the shoulder within the groove aforesaid at opposite sides of the notch.

11. A machine for uniting knitted webs comprising sewing mechanism, and a rotating support for a transfer ring having points adapted to be successively presented, for uniting of fabric loops thereon, to the sewing mechanism; in combination with means to lock the transfer ring to the support including a pair of diametric lugs, one with a lateral projection to engage an aperture in the ring at one side and the other to engage a notch in the bottom edge of the ring at the opposite side, the latter lug having a head seating in a circumferential groove of the ring and over-reaching the shoulder within the groove at opposite sides of the notch; and an upstanding semi-circular guard to assist in placement of the ring on the support.

12. A machine for uniting knitted webs comprising sewing mechanism, and a rotating support for a transfer ring having points adapted to be successively presented, for uniting of fabric loops thereon, to the sewing mechanism; in combination with means cooperating with an inclined cam edge at the bottom of the support to elevate the latter incidental to its rotation and thereby raise the transfer ring clear of the sewing instrumentality upon completion of the sewing operation.

13. A machine for uniting knitted webs comprising sewing mechanism; and a rotating support for a transfer ring having points adapted to be successively presented, for uniting of fabric loops thereon, to the sewing mechanism; in combination with means cooperating with an inclined cam edge at the bottom of the support to elevate the latter incidental to its rotation and thereby raise the transfer ring clear of the sewing mechanism upon completion of the sewing operation, said cam edge ending abruptly to permit the support to drop immediately upon starting of the machine to bring the transfer ring into coordinative relation with the sewing mechanism.

14. A machine for uniting knitted webs comprising sewing mechanism, and a rotating support for a transfer ring having points adapted to be successively presented, for uniting of fabric loops thereon, to the sewing mechanism; in combination with a pivoted member cooperating with an inclined cam edge at the bottom of the support to elevate the latter incidental to its rotation and thereby raise the ring clear of the sewing mechanism upon completion of the sewing operation, and means to withdraw the pivoted member aforesaid immediately upon starting of the machine, to permit the support to drop and thereby bring the transfer ring into coordinative relation with the sewing mechanism.

15. A machine for uniting knitted webs comprising sewing mechanism, a support for a transfer ring having fabric-loop-retaining points, and a rotary control drum determining an operative cycle of the machine incidental to which the support is stepped through a complete revolution for successive presentation of the fabric loops on the points of the transfer ring to the sewing mechanism; in combination with a member engaging the support from beneath to normally hold it in an elevated position facilitating application of the transfer ring thereto, means actuated by the control drum aforesaid effective to withdraw the member immediately upon starting of the machine, thereby to release the support and permit it to drop for the purpose of bringing the ring into coordinative relation with the sewing mechanism, and an inclined edge cam on the rotating support adapted to ride up the member and thus restore said support to the original raised position to facilitate removal of the transfer ring from the machine at the termination of the sewing operation.

16. A machine for uniting knitted webs comprising sewing mechanism, a rotating carrier for a divided transfer ring with component semi-circular sections each with a series of points for retaining fabric loops, means for turning one such section over the other for transfer and doubling of the loops thereon with those on the points of the other section; in combination with means to step about the carrier through a half revolution for successive presentation of the double loops to the sewing mechanism, and independent means for stepping about the carrier at a comparatively faster rate through the final half rotation.

17. A machine for uniting knitted webs comprising sewing mechanism, a rotating carrier for a divided transfer ring with component semi-circular sections each having a series of points for retaining fabric loops, means for turning one of such section over the other for transfer and doubling of the loops thereon with those on the points of the other section; in combination with a pawl for picking the carrier through half a revolution for successive presentation of doubled fabric loops to the sewing mechanism; and another independently-operative pawl for rotating the carrier through the remaining half revolution at a comparatively faster rate.

18. A machine for uniting knitted webs comprising sewing mechanism, a carrier for a transfer ring having fabric-loop-retaining points, means to step about the carrier through a complete rotation during each operative cycle of the machine for successive presentation of the loops on the points of the transfer ring to the sewing mechanism; in combination with a rotating control drum to determine the operative cycle of the machine, a pawl normally reciprocating idly over a blank space intervening a series of ratchet teeth on the drum, and manually-controlled means projectable into the path of the pawl to effect advancement of the blank space aforesaid beyond the said pawl in initiating the picking phase of the drum.

19. A machine for uniting knitted webs comprising sewing mechanism, a carrier for a transfer ring having fabric-loop-retaining points, means for stepping about the carrier for a complete rotation during each operative cycle of the machine for successive presentation of the loops on the points of the transfer ring to the sewing mechanism; in combination with a rotary control drum determining the operative cycle of the machine, a pawl normally reciprocating idly over a blank space intervening a series of ratchet teeth on the drum, a pivoted member with a pin to engage a notch in the drum, a trigger element pivoted on the member, and manually-operable means whereby said trigger element can be moved on its pivot to bring a projection thereof into the path of the pawl for impartation of movement, through the pivoted member aforesaid to the drum with resultant advancement of the blank space beyond said pawl in initiating the picking phase of the drum.

20. A machine for uniting knitted webs comprising sewing mechanism, a rotating carrier for a transfer ring having fabric-loop-retaining points adapted to be successively presented, for uniting of fabric loops thereon, to the sewing mechanism, and means to progressively rotate the carrier through a definite extent for each operative cycle of the machine; in combination with means to lock the carrier against accidental rotation incidental to application and removal of the transfer ring during intervals between successive operative cycles of the machine.

21. A machine for uniting knitted webs comprising sewing mechanism, a rotating carrier for a transfer ring having fabric-loop-retaining points adapted to be successively presented, for uniting of fabric loops thereon, to the sewing mechanism, and means to progressively rotate the carrier through a definite extent for each operative cycle of the machine; in combination with means to lock the carrier against accidental rotation incidental to application and removal of the transfer ring during intervals between successive operative cycles of the machine, and means to concurrently unlock the carrier and initiate its progression as aforesaid.

22. A machine for uniting knitted webs comprising sewing mechanism, a rotating carrier for a transfer ring having fabric-loop-retaining points adapted to be successively presented, for uniting of fabric loops thereon, to the sewing mechanism, and a pawl to pick ratchet teeth on the carrier in intermittently progressing it for the purpose specified, said pawl normally riding idly over a blank space among the ratchet teeth during quiescent periods of the machine; in combination with a latch to lock the carrier against accidental rotation incidental to application and removal of the transfer ring during intervals between successive operative cycles of the machine, and means to concurrently withdraw the latch and to advance the blank space beyond the province of the pawl in initiating picking of the carrier for the purpose aforesaid.

23. A machine for uniting knitted webs comprising sewing mechanism, a rotating carrier for a transfer ring having fabric-loop-retaining points adapted to be successively presented, for uniting of fabric loops thereon, to the sewing mechanism, and a pawl to pick ratchet teeth on the carrier in intermittently progressing it for the purpose specified, said pawl normally riding idly over a blank space among the ratchet teeth during quiescent periods of the machine; in combination with a latch to lock the carrier against accidental rotation incidental to application and removal of the transfer ring, and a finger for concurrently withdrawing the latch and engaging a projection on the carrier to advance the blank space beyond the province of the pawl in initiating picking of said carrier for the purpose aforesaid.

24. A machine for uniting knitted webs comprising sewing mechanism, a rotating carrier for a transfer ring having fabric-loop-retaining points adapted to be successively presented, for uniting of fabric loops thereon, to the sewing mechanism, and a pawl to pick ratchet teeth on the carrier in intermittently progressing it for the purpose specified, said pawl normally riding idly over a blank space among the ratchet teeth during quiescent periods of the machine; in combination with a latch to lock the carrier against accidental rotation incidental to application and removal of the transfer ring during intervals between successive operative cycles of the machine, a finger for concurrently withdrawing the latch and engaging a projection on the carrier to advance the blank space beyond the province of the pawl in initiating picking of said carrier for the purpose aforesaid, and a rotary cam drum to control the action of the finger.

In testimony whereof, I have hereunto signed my name at Philadelphia, Pennsylvania, this seventh day of January, 1927.

LOUIS N. D. WILLIAMS.